United States Patent Office 3,505,295
Patented Apr. 7, 1970

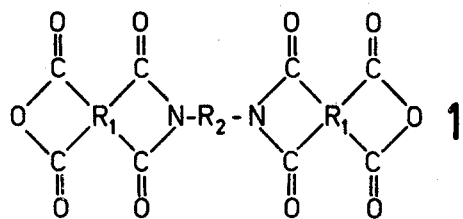 1
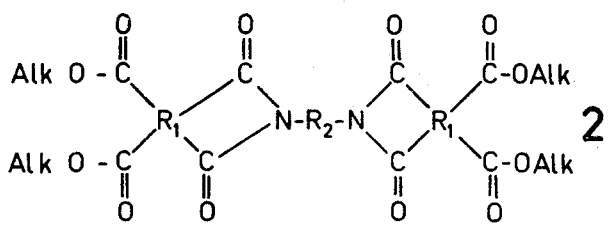 2
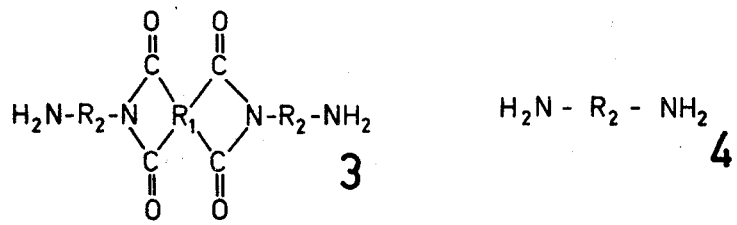 3 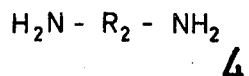 4
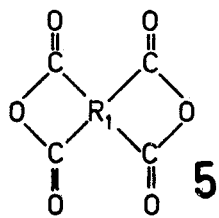 5 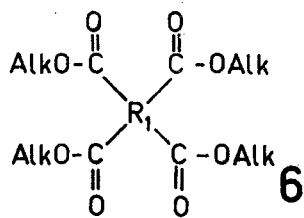 6
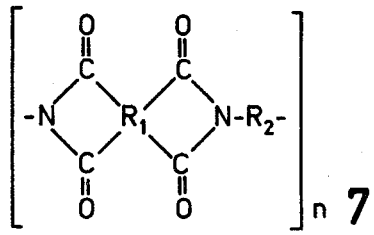 7
INVENTOR.
WALTER E. GRUNSTEIDL
BY PETRUS J. JANSSEN
AGENT

3,505,295
POLYIMIDE MOLDING POWDERS
Walter Edmund Grunsteidl and Petrus Johannes Janssen, Emmasingel, Eindhoven, Netherlands, assignors, by mesne assignments, to U.S. Philips Corporation, New York, N.Y., a corporation of Delaware
Filed Feb. 13, 1967, Ser. No. 615,454
Claims priority, application Netherlands, Feb. 15, 1966, 6601893
Int. Cl. C08g 20/32
U.S. Cl. 260—77.5     5 Claims

ABSTRACT OF THE DISCLOSURE

A precondensate of a tetracarboxylic acid and a polyamine containing imide bonds and functional groups (amine group or carboxylic groups) is reacted with a substance capable of reacting with the polycondensate while forming additional imide bonds. Each molecule of the reactive substance being capable of binding two molecules of the precondensate, one amine group being available for each two free carboxylic groups, the esters thereof or the anhydride thereof. The products obtained thereby have improved molding characteristics.

An example is the polyimide precondensate of pyromellitic acid anhydride (2 mols) and 4,4' diaminodiphenylether (1 mol) reacted with melamine.

---

The invention relates to a method of producing molding powders from which objects wholly or partly consisting of polyimide resin can be manufactured by compression at elevated temperatures.

Polyimides can be obtained by polycondensation of tetracarboxylic acid compounds and polyamine compounds. In general, they stand out by high resistance to heat, high mechanical strength and good electrical properties.

Polyimides are usually non-melting or high melting point products non-soluble or slightly soluble in most organic solvents. Therefore, it is difficult to manufacture molded products from said resins.

During the condensation of tetracarboxylic acids and polyamine compounds, polyamine acids are formed as intermediate products, which may, if desired, be separated out of the reaction mixture. In general, polyamide acids are more soluble, in particular, in organic polar solvents than polyimides. By thermal treatment these acids can be converted, while producing water or an alcohol, into the corresponding polyimide compounds and in this manner films, fibres or the like can be made from polyimide resin.

In practice, the process is usually as follows. In a solvent capable of forming a complex with the anhydride of the tetracarboxylic acid to be employed a tetracarboxylic acid anhydride and an aliphatic or aromatic diamine are dissolved in a molecular ratio of about 1:1. The solvent may be dimethylformamide or dimethylacetic amide. At room temperature or at a slightly higher temperature the desired polyamide acid is obtained in solution. The resultant solution may be used directly as a lacquer, an impregnating agent, wire varnish or for the manufacture of films and fibres. The polyamine acid is converted, subsequent to evaporation of the solvent, by heat into polyimide, while water is evolved.

To the solution of the polyamide acid may be added a mixture of acetic acid anhydride and pyridine, so that water is extracted chemically from the polyamide acid and polyimide is obtained. By a further treatment in vacuo at a higher temperature a solid product of polyimide can thus be made. However, it is particularly difficult to manufacture in this manner a product which is free of cracks and pores. Moreover, the great amount of shrinkage involved in the transition from the state of a gel to the solid can be checked and controlled only with difficulty. It is therefore not feasible to carry out this method so that products of the desired shape are obtained directly. Usually, the desired product is obtained by machining it.

Polyamide acids can be preserved only to a limited extent owing to continued condensation forming gradually more imide bonds. After some time polyimide resin separates out of the solution.

It has been proposed to produce a better workable polyimide resin powder by a given choice of starting substances or by taking particular shape.

It is possible, for example, to produce polyimides of comparatively low melting point (about 300° C.) by condensing a tetracarboxylic acid compound with a polyamine having a long carbon chain. However, in this case the often desired high heat resistance of the polyimide resins is partly sacrificed.

By special precautions it is possible to obtain a polyimide resin powder having a large specific surface that can be sintered. Such powders require high pressures (210 to 2100 kgs./cm.$^2$ and high temperatures (200 to 500° C.) during the molding process. Flow of the molding powder does not occur. Consequently, particular requirements have to be fulfilled by the material. Usually the powder is compressed to form a block or rod, from which the desired objects are machined. The invention has for its object to provide a method of producing polyimide molding powders, which do not exhibit these disadvantgaes and which can be molded by high pressure and high temperature, while flowing, to pore-free products.

According to the invention an imide bond containing precondensate of a tetracarboxylic acid (anhydride or ester thereof) and a polyamine which precondensate still contains free functional groups (amino groups, carboxylic groups, anhydrides or esters thereof) is reacted with reactive substance containing groups capable of forming additional imide bonds by reacting with the free functional groups of the precondensate, each molecule of said reactive substance being capable of combining with two molecules of the precondensate, the functional groups of the reactive substance being amino, carboxylic, ester or anhydride groups.

The reactive substance is chosen so that one amino group is available for each two carboxylic groups, anhydride thereof or esters thereof.

Molding powders thus obtained can be compressed in a mold at temperatures lying between 100° and 350° C. and at pressure lying between 2000 kgs./cm.$^2$. While water or alcohol evaporates out, a reaction takes place which depends upon the constituents used and the relevant pressure, while both constituents or one of the constituents melt(s) in dependence upon the composition of the molding powder.

Surprisingly the experiments leading to the invention showed that even molding powders consisting of a mixture of reactive precondensates, which normally do not exhibit a detectable melting point under atmospheric pressure will flow under higher pressure and at temperatures around 300° C. Satisfactory products are, however, also obtained by heating the material first at the desired temperature and by compressing it subsequently. Such a powder consists of a mixture of a precondensate as indicated in FIGS. 1A and 1B respectively with a precondensate as indicated in FIG. 2 (see formula sheet).

The resultant products are usually brown to dark brown-black, hard and non-fusible.

The imide-bond containing precondensate can be obtained as follows:

In an appropriate solvent, in which the two starting substances are soluble, the dianhydride or the tetra-ester of a tetracarboxylic acid is caused to react with an aliphatic or aromatic diamine in a molecular ratio of about 2:1 or 1:2. By raising the temperature above 100° C., or by evaporating the solvent and by heating, a diimide is formed directly. A fine powder is obtained which precipitates from the liquid phase and can be filtered off; the small particle size allowing satisfactory mixing with the other constituents of the molding powder. The precondensate either has the general formula of FIGS. 1A or 1B respectively of the formula of FIG. 2 (see the accompanying formula sheet), in accordance with the choice of the quantities and types of starting materials. The carboxyl-group carrying component is preferably used in its dianhydride form. Suitable solvents for producing the precondensates are for example dimethylformamide, dimethylacetic amide, dimethylsulphide, N-methylpyrrolidone.

Depending upon the type of reactive groups still present the precondensate is mixed in the solid state and in the absence of a solvent with either a diamine of the general formula of FIG. 3 or with a dianhydride or a tetraester of a tetracarboxylic acid of the general formula of FIGS. 4A or 4B respectively.

During the reaction of a homofgeneous mixture of the precondensate and the compounds capable of reacting herewith a resinous product of the general formula of FIG. 5 is obtained, in which $n$ may be high and even very high.

Referring to the figures, reference $R_1$ designates a tetravalent aromatic, aliphatic or cycloaliphatic radical or a mixture thereof, containing at least one saturated or unsaturated six membered ring, in which the carboxylic groups are directly bonded pairwise to two adjacent carbon atoms of a ring.

Examples are the dianhydrides and tetraesters such as the tetraethyl- or tetramethylesters, of:

pyromellitic acid;
mis-(3,4-dicarboxy-phenyl)-esters;
2,2-bis-(3.4-dicarboxy-phenyl)-propane;
1,2,5,6-naphthalene tetracarboxylic acid;
3,3',4,4'-diphenyl-tetracarboxylic acid;
1,2,3,4-cyclopentane-tetracarboxylic acid;
$\Delta^{4,9}$-octaline-1,2,6,7-tetracarboxylic acid;
3,3',4,4'-benzophenone tetracarboxylic acid.

$R_2$ designates a bivalent aliphatic or aromatic radical, which contains at least three carbon atoms. Examples thereof are:

benzidine;
4,4'-diamine-diphenylsulphone;
1,5-diaminonaphthalene;
4,4'-diaminodiphenylmethane;
m-phenylene-diamine;
p-phenylene-diamine;
p-xylylene-diamine;
di-(p-aminoclohexyl)-methane;
hexamethylene-diamine and homologues;
1,4-diaminocyclohexane;
2,2-bis-(4-aminophenyl)-propane;
4,4'-diaminodiphenylsulphide;
4,4'-diaminodiphenylether;
3,4'-diaminobenzanilide.

These amines may be used, for example, for the production of a precondensate with one or more of the aforementioned tetracarboxylic acids in a molecular ratio of 2:1 or 1:2 or together with a precondensate containing anhydride groups to obtain a molding powder according to the invention.

The method according to the invention provides the particular advantage that as amine constituents, for example. melamine, substituted melamines, benzoguanamine, ammelin, triaminomelamine urea, guanidine may be employed for the production of polyimide molding powders. From these amines themselves it is not possible to produce in a simple manner the polyimides, since there are practically no solvents in which both the tetracarboxylic acids (anhydrides or tetraesters) and said amines can be dissolved adequately. However, these amines can be mixed with a preliminary product with reactive anhydrides groups in the dry state and be converted into a polyimide. Thus strongly cross-linked, hard products with particularly high thermal resistance can be obtained. As stated above, due to the unsolubility or the low solubility of these amines in the solvents commonly employed in the production of polyimides, it has previously not been possible to use these amines satisfactorily.

The method according to the invention also provides the possibility to manufacture, by a suitable choice of the constituents, the objects under comparatively easy conditions. This applies, for example, to the case in which one of the constituents has a comparatively low melting point. It is then preferred to use substances or to mix substances which have a melting range. By this means the low melting point constituent is prevented from being pressed out of the mixture, when the press is closed.

In the production of the polyamide molding powders according to the invention all substances commonly used for the production of polyimides may be employed. The invention provides the possibility of producing polyimides, the chains of which exhibit a regular alternation of different amines or tetracarboxylic acids or of both.

Filling substances for the polyamide molding powders according to the invention may be: inert, inorganic filling substances, graphite, asbestos, molybdenum disulphide, mica, carbon black or mixtures theerof.

The invention will be described more fully with reference to the following examples.

EXAMPLE 1

Production of a precondensate with two anhydride groups per molecule (precondensate A)

In a round bottom flask of 5 litres, provided with a thermometer, a stirrer, a dropping funnel, a condenser with a $CaCl_2$ guard-tube and an inlet tube for introducing nitrogen, 2 grmols of pyromellitic acid dianhydride is dissolved in 2 litres of N-methyl pyrrolidone, while nitrogen is introduced. After the pyromellitic acid dianhydride has dissolved, 1 gmol of 4,4'-diamino-diphenylether is dissolved in 500 mls. of N-methylpyrrolidone and added to said solution in drops, while stirring. The temperature is raised gradually to about 55° C. The solution is then heated to the boiling point and kept at the boiling temperature for 15 minutes. During the boiling process the desired precondensate starts to precipitate. The reaction mixture is then cooled and the precipitated precondensate is filtered off and washed with dimethylformamide. The precondensate is then suspended for complete dehydration in acetic acid anhydride, to which a small amount of pyridine is added, the precondensate being again filtered off. The resultant product is dried in vacuo at 130° C. until the solvent has disappeared.

The powdery precondensate is yellow-brown and does not exhibit a detectable melting point. Heated in a closed melting-point tube at about 525° C., the substance changes into dark brown and at about 540° C. the precondensate is quite black. Infrared analysis of the precondensate proves that there are both anhydride groups and imide bonds in a ratio such that the precondensate consists for the major part of a compound of 2 molecules of pyromellitic acid anhydride and 1 molecule of 4,4'-diaminodiphenylether.

EXAMPLE 2

Production of a precondensate with two amino-groups per molecule (precondensate B)

In a round-bottom flask of 5 litres, provided with a thermometer, an agitator, a condenser with a $CaCl_2$ guard-tube, a filling funnel, an inlet tube for introducing nitrogen, 2 gmol of 4,4'-diaminodiphenylether is dissolved in 2 litres of N-methylpyrrolidone, while nitrogen is fed in. Whilst stirring and slightly heating, 1 gmol of pyromellitic acid anhydride in the form of a powder is added through the filling funnel. The temperature rises to about 50° C. After the pyromellitic acid anhydride has been completely added, the reaction mixture is heated at boiling temperature. At about 150° C. the desired precondensate precipitates. After cooling the precondensate is filtered off, washed with N-methylpyrrolidone and then with diethylether.

The precondensate is dried at room temperature in vacuo.

The resultant grey-yellow powder does not exhibit a detectable melting point. During heating in a closed melting-point tube colour change appears at about 520° C; at 530° C. the product is quite black.

EXAMPLE 3

Production and processing of a molding powder consisting of a mixture of two precondensates 282 gs. of the precondensate A (Example 1) is thoroughly mixed with 289 gs. of the precondensate B (Example 2). A mold is filled with this mixture. Under a pressure of 1000 kgs./cm.² the temperature is raised to 350–360° C. At about 300° C. the molding powder starts flowing. After about 2 minutes at 350 to 360° C. the product is cooled and released. The product is brown-black, very hard and rigid. Its shape corresponds with the mold up to the finest details. A test rod of the molded product was kept at 250° C. for a fortnight. The loss of weight was 1.2%. The infrared analysis did not prove the presence of anhydride groups in the molded product.

A portion of the molding powder was mixed with asbestos, so that the content of filling substance was 50% by weight. The compression was carried out under a pressure of 1000 kgs./cm.² at a temperature of 350° C. The resultant product was dark-brown-black, mechanically very resistant and had a smooth surface. The weight-less was 1.6% after a fortnight at 250° C.

EXAMPLE 4

Production and processing of a molding powder of a mixture of precondensate A and a polyamine (melamine)

2 gmols of melamine was mixed with 1700 gs. of precondensate A (Example 1).

At a temperature of 250° C., under a pressure of 500 kgs./cm.² a rod was made by compression. Time of compression was 10 minutes. During the pressing process flow occurred. The resultant product was dark brown and mechanically strong. The infrared analysis did not show the presence of anhydride groups in the molded product.

The molding powder was mixed with 50% by weight of asbestos. The same molding process provided also mechanically resistant products.

EXAMPLE 5

Production and processing of a molding powder of a mixture of precondensate A and a polyamine (urea)

60 gs. of urea and 564 gs. of precondensate A (Example 1) were intensively mixed.

In a mold the powder was exposed to a pressure of 3 kgs./cm.² and a temperature of 280° C; flow occurred. After 5 minutes the pressure was raised to 1000 kgs./cm.² and after a further 10 minutes the product was cooled and disengaged.

The resultant product was black, mechanically resistant. The loss of weight was 1.9% after 12 days at 250°C.

EXAMPLE 6

Production and processing of a molding powder of a mixture of precondensate A and a polyamine (benzoguanamine)

A molding powder was made by intensive mixing of 93 gs. of benzoguanamine, 282 gs. of precondensate A, 300 gs. of asbestos.

Under a pressure of 2 kgs./cm.² the powder was compressed in a mold and heated at 250° C. After 5 minutes the pressure was increased to 500 kgs./cm.². After 5 minutes at this pressure the product was cooled and removed from the mold.

The product was brown and very hard.

EXAMPLE 7

Production and processing of a molding powder of a mixture of precondensate B and a tetracarboxylic acid (benzophenone tetracarboxylic acid anhydride)

A molding powder was made by mixing 26 gs. of benzophenone tetracarboxylic acid anhydride and 58 gs. of precondensate B (Example 2).

Under a pressure of 100 kgs./cm.² and at a higher temperature a product was molded from said powder (time of compression 15 minutes). During the compression flow occurred at 235°.

The resultant product was black and mechanically resistant.

What is claimed is:

1. A molding powder for the production of polyimide resin products, the reactive components of said molding powder consisting essentially of a mixture of (1) a polyimide containing compound selected from the group consisting of a polyimide of the Formula 1A

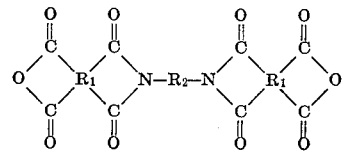

a polyimide of the Formula 1B,

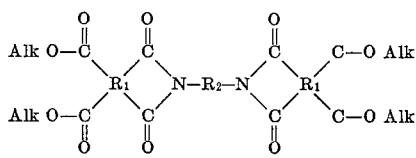

and a polyamide of the Formula 2

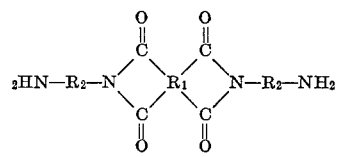

wherein $>R_1<$ is a tetravalent cycloaliphatic or aromatic hydrocarbon radical containing at least one six membered carbocyclic ring and in which each of the two pairs of the carbonyl groups in the above formula is attached directly to adjacent carbon atoms of the ring, Alk is alkyl, and $R_2$ is a bivalent carbocyclic radical selected from the group consisting of aromatic and cyclohexyl rings and (2) a reactive compound the molecules of which are capable, upon the application of heat, of forming additional imide bonds with the polyimides (1), said reactive compound (2) being selected from the group consisting of a polyamide of the above-mentioned Formula 2, a polyimide of the above-mentioned Formula 1A and a polyimide of the above-mentioned Formula 1B, dianhydrides of the formula

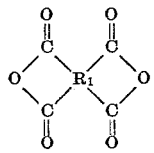

wherein $R_1$ has its above designated meaning, tetraesters of the formula

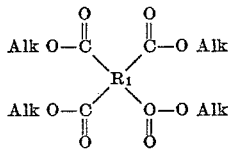

wherein $R_1$ has its above-designated meaning and Alk is alkyl, diamines of the formula $$H_2N—R_3—NH_2$$

wherein $R_3$ is a member consisting of bivalent aliphatic and aromatic carbocyclic radicals, and melamine, benzoguanamine, ammelin, triaminomelamine, urea and guanidine, the ratio of the polyimide (1) to the reactive compound (2) being such that one amino group is present for each two carboxylic groups, ester groups or anhydride group thereof.

2. The molding powder of claim 1 the reactive components of which consist essentially of a mixture of a polyamide of the Formula 2 and a polyimide of the Formula 1A or 1B.

3. The molding powder of claim 1 the reactive components of which consist essentially of a polyimide of the Formula 1A or 1B and a diamine selected from the group consisting of diamines of the formula $$H_2N—R_3—NH_2$$

melamine, benzoguanamine, ammelin, urea, triaminomelamine and guanidine.

4. The molding powder of claim 1 the reactive components of which consist essentially of a mixture of a polyamide of the Formula 2 and a dianhydride of a tetracarboxylic acid of the formula

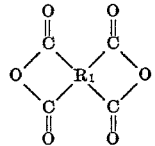

5. The molding powder of claim 1 wherein in addition a filler is present.

References Cited

UNITED STATES PATENTS

| | | | |
|---|---|---|---|
| 3,179,614 | 4/1965 | Edwards | 260—78 |
| 3,179,630 | 4/1965 | Endrey | 260—78 |
| 3,179,631 | 4/1965 | Endrey | 260—78 |
| 3,238,181 | 3/1966 | Anderson | 260—78 |
| 3,264,250 | 8/1966 | Gall | 260—78 |
| 3,342,768 | 9/1967 | Chalmers | 260—78 |
| 3,380,964 | 4/1968 | Grundschober et al. | 260—78 |

HAROLD D. ANDERSON, Primary Examiner

U.S. Cl. X.R.

260—37, 47, 65, 78

UNITED STATES PATENT OFFICE
CERTIFICATE OF CORRECTION

Patent No. 3,505,295　　　　　　　　　　Dated April 7, 1970

Inventor(s) Walter Edmund Grunsteidl et al.

It is certified that error appears in the above-identified patent and that said Letters Patent are hereby corrected as shown below:

Column 3, line 27, "homofgeneous" should read -- homogeneous --; line 41, "mis-" should read -- bis- --.

Signed and sealed this 9th day of March 1971.

(SEAL)
Attest:

EDWARD M. FLETCHER, JR.　　　　　　　WILLIAM E. SCHUYLER, JR.
Attesting Officer　　　　　　　　　　　Commissioner of Patent